United States Patent
Jayachandran et al.

(10) Patent No.: US 11,556,906 B2
(45) Date of Patent: Jan. 17, 2023

(54) ENFORCING MULTI-USE CONSTRAINTS ON A BLOCKCHAIN

(71) Applicant: International Business Machines Corporation, Armonk, NY (US)

(72) Inventors: Praveen Jayachandran, Bangalore (IN); Palanivel A. Kodeswaran, Bangalore (IN); Sayandeep Sen, Bangalore (IN)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 16/504,866

(22) Filed: Jul. 8, 2019

(65) Prior Publication Data

US 2019/0333032 A1    Oct. 31, 2019

Related U.S. Application Data

(63) Continuation of application No. 15/350,645, filed on Nov. 14, 2016, now Pat. No. 10,380,560.

(51) Int. Cl.
*H04L 9/00* (2022.01)
*G06Q 20/06* (2012.01)
*H04L 9/32* (2006.01)

(52) U.S. Cl.
CPC ......... *G06Q 20/065* (2013.01); *H04L 9/3236* (2013.01); *H04L 9/3297* (2013.01); *G06Q 2220/00* (2013.01); *H04L 9/50* (2022.05)

(58) Field of Classification Search
CPC .............. G06Q 20/065; G06Q 2220/00; H04L 9/3236; H04L 9/3297; H04L 2209/38

USPC ........................................................ 713/168
See application file for complete search history.

(56) References Cited

U.S. PATENT DOCUMENTS

| | | | |
|---|---|---|---|
| 10,366,204 B2* | 7/2019 | Tanner, Jr. | G06Q 50/22 |
| 2007/0130032 A1 | 6/2007 | Nelson et al. | |
| 2010/0082358 A1 | 4/2010 | Begue et al. | |
| 2014/0089189 A1* | 3/2014 | Vasireddy | G06Q 20/4016 705/44 |
| 2015/0332283 A1* | 11/2015 | Witchey | G06Q 50/22 705/3 |
| 2016/0217436 A1 | 7/2016 | Brama | |
| 2017/0132393 A1* | 5/2017 | Natarajan | G06Q 10/087 |
| 2017/0132621 A1* | 5/2017 | Miller | G06Q 20/065 |
| 2017/0300627 A1* | 10/2017 | Giordano | G06F 21/6245 |
| 2017/0372300 A1 | 12/2017 | Dunlevy et al. | |
| 2018/0130034 A1* | 5/2018 | Taylor | G06Q 20/02 |

OTHER PUBLICATIONS

List of IBM Patents or Patent Applications Treated as Related, Dec. 9, 2019.

(Continued)

*Primary Examiner* — Christopher J Brown

(57) ABSTRACT

A blockchain configuration may be used to store a distributed ledger for information security and accessibility. One example method of operation may include one or more of logging an asset in a blockchain, identifying a sub-asset linked to the asset, creating a use constraint for the sub-asset, logging the use constraint associated with the sub-asset, and during an access attempt of the sub-asset, prohibiting access to the sub-asset based on the use constraint.

14 Claims, 5 Drawing Sheets

(56) References Cited

OTHER PUBLICATIONS

P. Jayachandran et al., "Enforcing Multi-Use Constraints on a Blockchain", U.S. Appl. No. 15/350,645, filed Nov. 14, 2016 (a copy is not provided as this application is available to the Examiner).

Anonymous; "Usage Verification Probability Based on Asset to Asset Holder Proximity"; an IP.com Prior Art Database Technical Disclosure;; Sep. 6, 2013.

Anonymous; Universal Blockchained Health Record; an IP.com Prior Art Database Technical Disclosure; Apr. 13, 2016.

\* cited by examiner

ENFORCING MULTI-USE CONSTRAINTS ON A BLOCKCHAIN

TECHNICAL FIELD

This application relates to using a blockchain to enforce use constraints, and more particularly, to utilizing blockchain asset data to enforce constraints assigned with assets.

BACKGROUND

In a blockchain, information is typically related to financial transactions. As the popularity of blockchain continues to increase, so does the desire to implement additional functions on the blockchain. A limitation that exists is an inability to efficiently track assets which are linked to a blockchain via a transaction or a purchase.

SUMMARY

One example embodiment may include a method that comprises at least one of logging or storing an asset in a blockchain, identifying a sub-asset linked to the asset, creating a use constraint for the sub-asset, logging or storing the use constraint associated with the sub-asset, and during an access attempt of the sub-asset, prohibiting access to the sub-asset based on the use constraint.

Another example embodiment may include an apparatus that includes at least one of a processor configured to perform at least one of log an asset in a blockchain, identify a sub-asset linked to the asset, create a use constraint for the sub-asset, a memory configured to store the use constraint associated with the sub-asset, and during an access attempt of the sub-asset, the processor is further configured to prohibit access to the sub-asset based on the use constraint.

Still another example embodiment may include a non-transitory computer readable storage medium configured to store instructions that when executed causes a processor to perform at least one of logging an asset in a blockchain, identifying a sub-asset linked to the asset, creating a use constraint for the sub-asset, storing the use constraint associated with the sub-asset, and during an access attempt of the sub-asset, prohibiting access to the sub-asset based on the use constraint.

DETAILED DESCRIPTION

Figure 1:
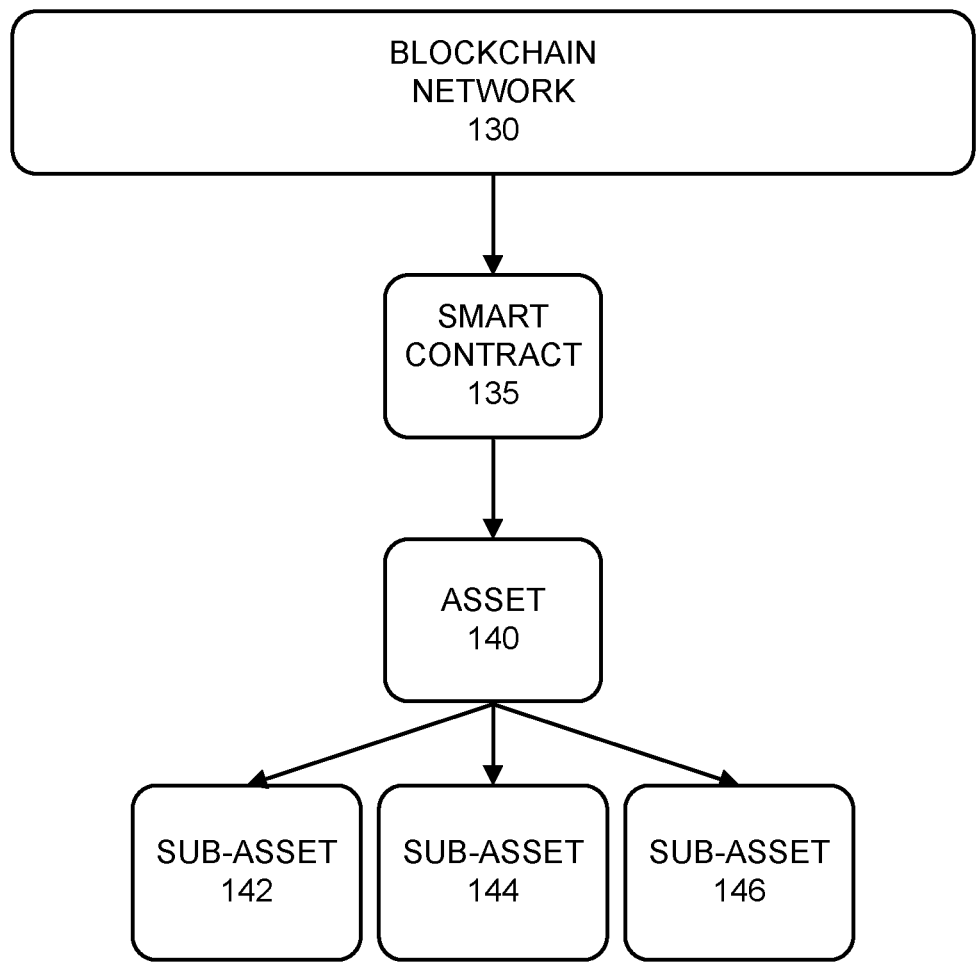
FIG. 1 illustrates a logic diagram of a blockchain asset tracking configuration according to example embodiments.

It will be readily understood that the instant components, as generally described and illustrated in the figures herein, may be arranged and designed in a wide variety of different configurations. Thus, the following detailed description of the embodiments of at least one of a method, apparatus, and system, as represented in the attached figures, is not intended to limit the scope of the application as claimed, but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

Example embodiments provide an application and/or software procedure which provides asset tracking and monitoring. In one embodiment, enforcement of asset constraints and/or conditions can occur in a blockchain. Blockchain asset data can be utilized to enforce the constraints assigned with the assets. For example, assets which are linked to a blockchain via a transaction or purchase can also be referenced to identify and/or update status information regarding the asset.

An asset may be any item logged, stored or referenced in a blockchain, such as a digital version of a physical asset. For example, a medical prescription, an entertainment event ticket, etc. In general, logging and tracking of assets may be more likely to be performed on an asset with an ongoing interest, such as a recurring medical prescription with refills, a ticket to a series of events which have not yet occurred, or a bill for a service which has not been paid. Any asset can be tracked and monitored and may have sub-assets which are linked to the asset. Assets with more sub-assets which receive ongoing tracking can greatly benefit by the procedures and operations described by a blockchain monitoring application.

Enforcing a multi-use constraint, such as a recurring medical prescription refill, may include tracking one or more sub-assets. For example, as the asset is entered in a blockchain, such as part of a user profile and/or a user's medical profile or health care/insurance profile, various sub-assets can be used to identify the asset and to link constraints to one or more of the sub-assets. For example, a prescription may have a first sub-asset related to quantity, a second sub-asset related to refill dates, a third sub-asset related to co-pay (price), a fourth sub-asset related to potential pharmacy violations (i.e., do not prescribe medication XYZ with the current prescription medication ABC), etc., a fifth sub-asset related to limits on prescriptions from other parties (i.e., no additional prescriptions for ABC permitted), etc. The number of sub-assets may be linked to an asset as links which are created anytime such an asset is logged in a user profile on a blockchain.

The blockchain configuration for managing assets may be configured as a shared ledger which includes converting physical assets into their corresponding digital representations and registering the creation. Transferring and deleting such assets in the blockchain in an effort to continuously monitor and mirror the physical asset ownership can occur. For example, a digital representation of a medical prescription could include but is not limited to a prescription identifier (ID), doctor ID, patient ID, medicines, quantities, refill rules, multi-prescription violations, etc. In operation, a secure hash, such as encrypted data and an encryption key is created to secure the asset data. A unique asset ID is used to identify the prescription on the blockchain and unique sub-asset IDs may be used to identify the sub-assets on the blockchain.

In one example method of operation, sub-assets may be created which are derived from a single "master" asset on a blockchain. The sub-assets may be based on a number of conditions, such as expiration date, unavailability, etc. Continuing with the same medical prescription example, assuming the prescription is a one month or 30-day prescription, the prescription is refilled at the beginning of each month. The pill count (i.e., 30 pills) is a sub-asset derived from the prescription. Actions identified to modify the asset or complement the asset are compared against the current sub-asset. Analytics can be performed on the transactions to enforce multi-use constraints specified ahead of time. The decision results can be stored on the blockchain for subsequent audit efforts by interested third parties. Constraints may be created to limit when and how many times (N) an asset (A) can be used over a period of time (T). For example, in an effort to reduce prescription irregularities, for example to obtain multiple prescriptions for the same ailment, the sub-assets of the asset (prescription) can be processed against an attempted modification to the asset.

In one example, crypto-currency double-spending can be a multi-use constraint. A number of business processes in the physical world are based on paper receipts (i.e., bearer certificate) that can be forged and used multiple times, such as medical prescriptions, insurance related documents, concert and event tickets, etc. This may result in fraud leading to various losses. The lack of continuous tracking of ownership of assets through a lifecycle is one cause of failure.

In another example, in the case of prescription irregularities, a retail store may check if a pill count has not exceeded the monthly limit before dispensing. The user may have already received some quantity from another store, and the result of the determination or computation can be stored as an available refill sub-asset on the blockchain before issuing medications. The prescription tracking can also provide data for analytics to identify larger concerns related to multiple users.

In other examples, a system configuration may enforce space-time constraints. For example, by computing the time interval between two "sightings" of a vehicle, such as at a toll station, the application can estimate the speed of the vehicle, and automatically fine the vehicle owner if the speed exceeds a set limit.

FIG. 1 illustrates a logic diagram of a blockchain asset tracking configuration according to example embodiments. Referring to FIG. 1, the example diagram 100 includes a blockchain network 130 as a computing platform or server(s) used to store blockchain transactions. A smart contract 135 may be established to store user profile data pertaining to assets purchased, sold or currently active in the blockchain. Each asset 140 may have multiple sub-assets 142, 144 and 146. The sub-assets 142-146 and the asset 140 each may be logged in a user profile associated with a user account that owns the asset 140. The user profile and/or the user account may be stored on the network 130, the smart contract 135, the asset 140, any of the sub-assets 142-146, or on another device communicably coupled to one or more of the elements described or depicted herein. Each time an asset related transaction occurs, the sub-assets may be compared to the transaction to identify whether a violation will occur if the transaction were to proceed. For example, transaction parameters may be identified and compared to the sub-assets to identify a match and a violation.

Figure 2:
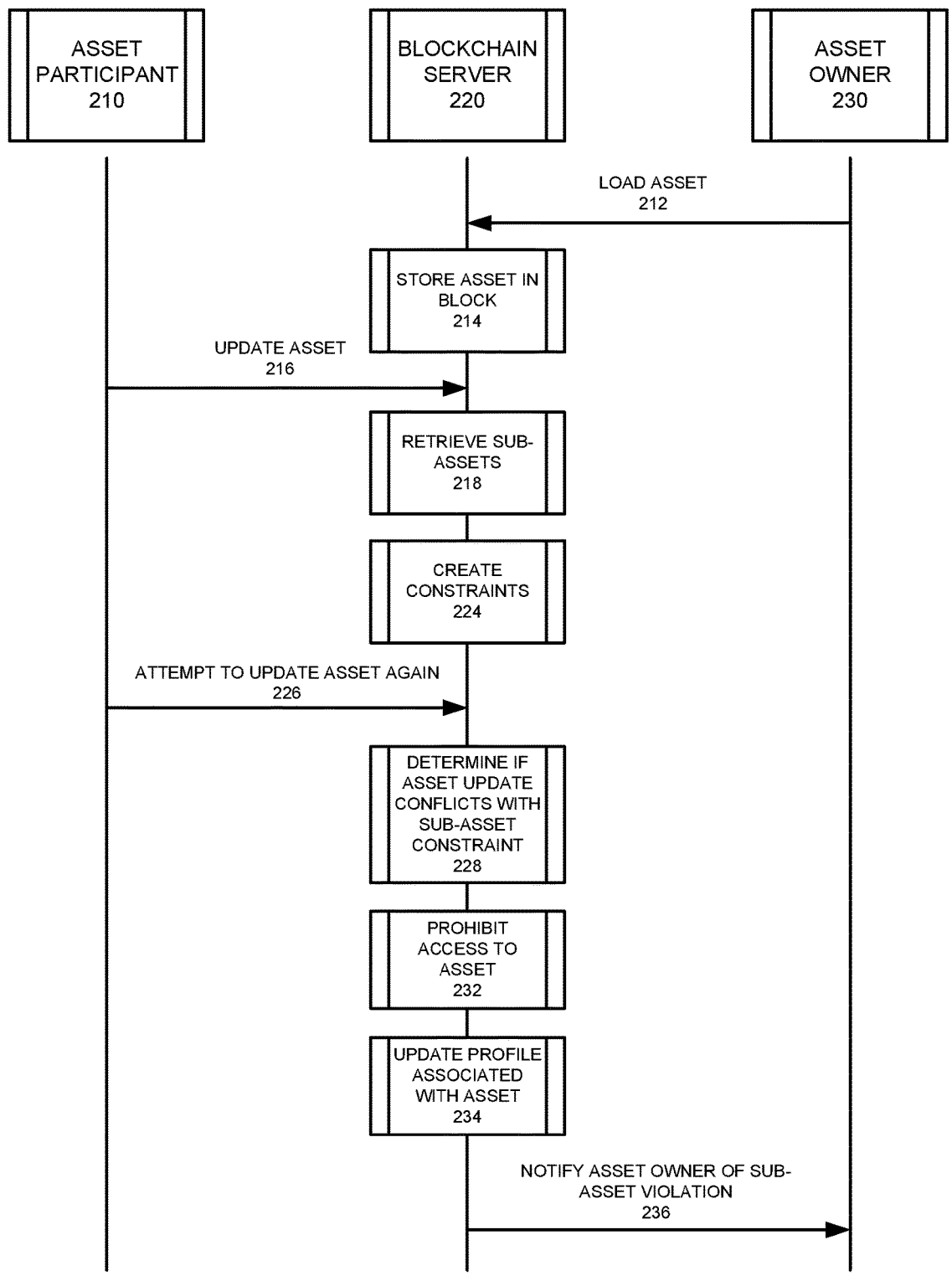
FIG. 2 illustrates a system signaling diagram of a blockchain asset tracking configuration according to example embodiments.

FIG. 2 illustrates a system signaling diagram of a blockchain asset tracking configuration according to example embodiments. Referring to FIG. 2, the system 200 includes a blockchain server 220 or blockchain device responsible for maintaining a ledger and smart contracts used to log the assets. In operation, an asset owner device 230 (or asset owner) may purchase an asset, receive an asset or update an asset which causes the asset to be loaded 212 in the blockchain 220. The asset data is stored in the blockchain 214 and any subsequent updates 216 may be received from an assets participant device 210 (or asset participant) and screened by retrieving sub-assets associated with the asset 218 and creating constraints 224 which are linked to the sub-assets. For example, a sub-asset may be a pill quantity (SA1) and the constraints may be 30 pills (C1) over 30 days (C2). Once the constraints are established and logged, any attempt to modify the asset 226 will be processed to determine whether any violations occur during that process, such as an asset update conflicting with a sub-asset constraint 228. The access to the asset will be prohibited 232 if a violation is identified. The user profile associated with the asset 234 will be updated to reflect the violation, attempted violation or any other data associated with the transaction. Also, the asset owner 230 will be notified of the attempted violation 236. Any interested party, such as an auditor, may be notified to maintain diligence during the asset management procedures.

In general, an asset will have at least one sub-asset constraint. Each time an asset related transaction occurs (i.e., prescription refill), each constraint would specify the set of sub-assets that need to be screened for each type of asset related transaction. In one embodiment, the access attempt, the results of the analytics, and access control decision(s) would be stored on the blockchain. Any asset that has constraints can be logged in the blockchain. One blockchain network may be assumed for each asset type, in which case all assets in that network will be tracked. Alternatively, an asset may be monitored by a specific filter configured by a third party. When an asset is accessed, analytics can be performed based on the constraint. Analytics code in the form of a smart contract can be provided along with a constraint. For example, in the prescription use case, when a refill attempt is made, the analytics code can fetch the current date from a trusted server specified in the constraint, determine whether a new refill period has started, determine whether a user has already "spent" a refill quantity, and based on this information, permit the refill action to go through or not go through. The results of the analytics can also be written to the blockchain.

Figure 3A:
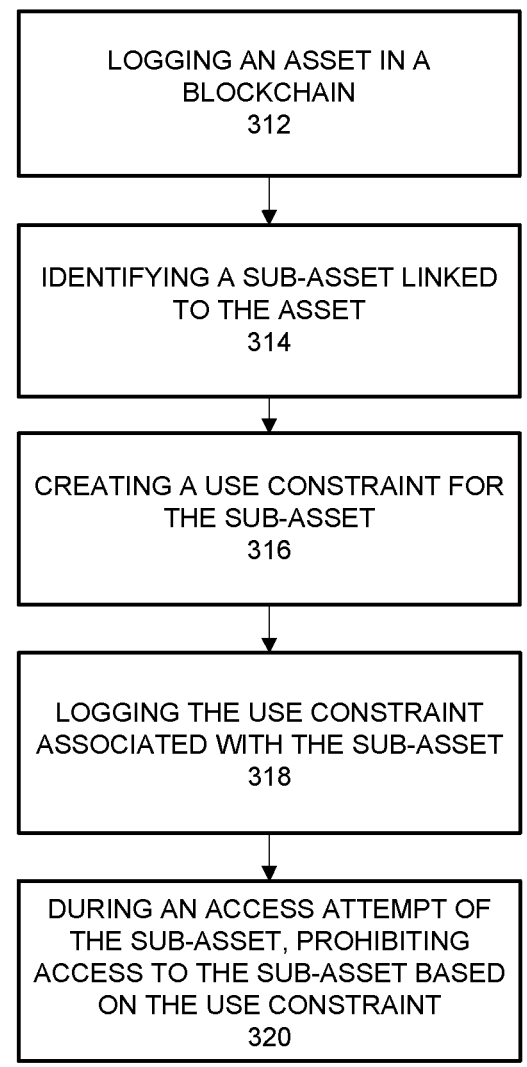
FIG. 3A illustrates a flow diagram of an example method of operation according to example embodiments.

FIG. 3A illustrates a flow diagram of an example method of operation according to example embodiments. Referring to FIG. 3A, the method 300 may include one or more of logging an asset in a blockchain 312, identifying a sub-asset linked to the asset 314 creating a use constraint for the sub-asset 316, logging the use constraint associated with the sub-asset 318, and during an access attempt of the sub-asset, prohibiting access to the sub-asset based on the use constraint 320. The asset may include a plurality of sub-assets each linked to a corresponding plurality of use constraints. Also, when any of the plurality of use constraints are identified during the access attempt of the sub-asset, access to the corresponding sub-asset can be prohibited for any period of time (which may be a predetermined period of time). The method may also include creating a profile for the asset including a plurality of identifiers and a plurality of sub-assets, and storing the profile in a blockchain. The profile identifiers may include one or more of an asset name, an asset supplier, an asset recipient, an asset quantity, an asset renewal date, and a list of sub-assets. The method may further include creating a secure hash identifier to represent the asset in the blockchain, storing the secure hash identifier in the blockchain, receiving the sub-asset access attempt, responsive to receiving the sub-asset access attempt, retrieving the profile from the blockchain, and creating an analytic report comprising stored sub-asset access attempts, and a current sub-asset status.

Figure 3B:
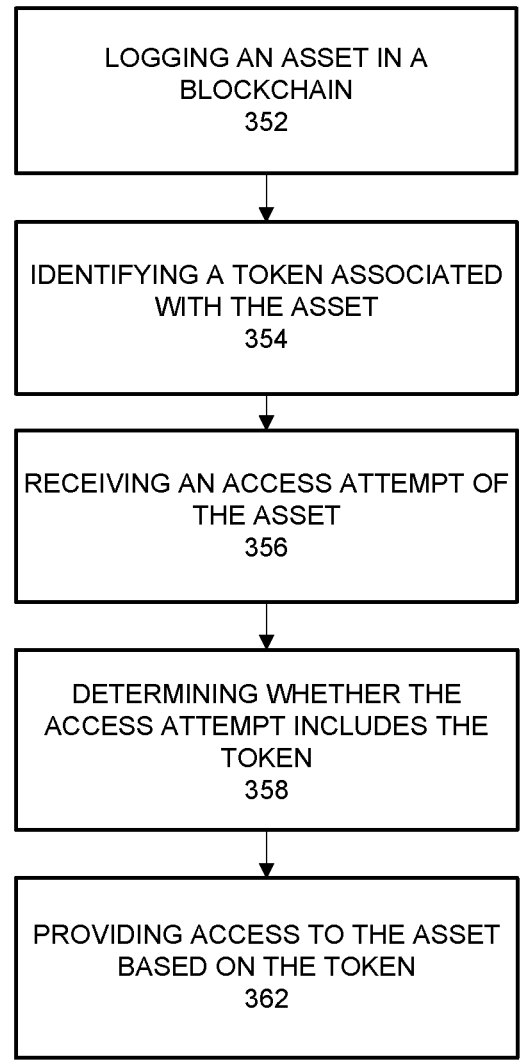
FIG. 3B illustrates another flow diagram of another example method of operation according to example embodiments.

FIG. 3B illustrates another flow diagram of another example method of operation according to example embodiments. Referring to FIG. 3B, the method 350 may include one or more of logging an asset in a blockchain 352, identifying a token associated with the asset 354, receiving an access attempt of the asset 356, determining whether the access attempt includes the token 358, and providing access to the asset based on the token 362. In this example, sub-asset tracking may not be necessary as the token required to access the asset or the sub-assets may be used to determine whether the user is privileged and has rights to access the asset. In operation, any attempt to modify the assets/sub-assets may be thwarted which limits access to third parties not having the required token.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 4 illustrates an example network element 400, which may represent or be integrated in any of the above-described components, etc.

Figure 4:
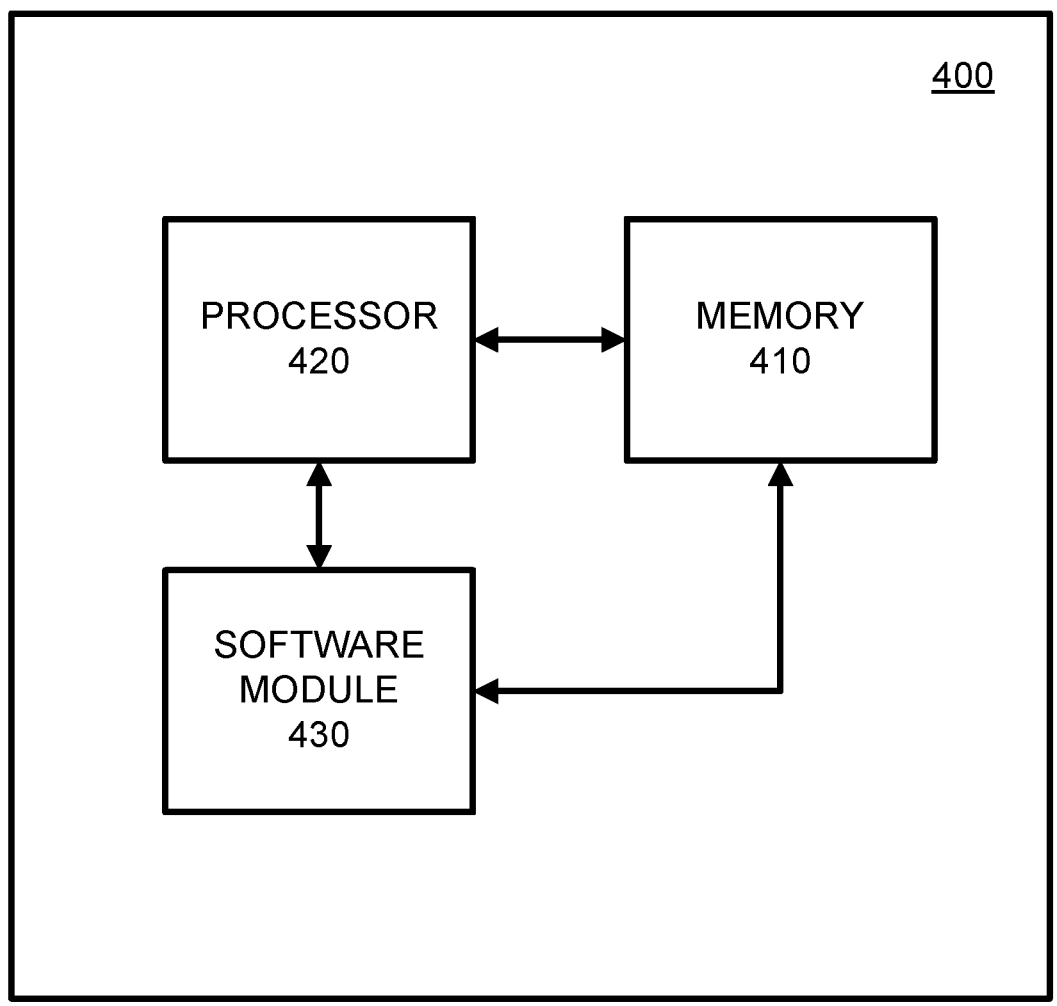
FIG. 4 illustrates an example network entity configured to support one or more of the example embodiments.

As illustrated in FIG. 4, a memory 410 and a processor 420 may be discrete components of a network entity 400 that are used to execute an application or set of operations as described herein. The application may be coded in software in a computer language understood by the processor 420, and stored in a computer readable medium, such as, a memory 410. The computer readable medium may be a non-transitory computer readable medium that includes tangible hardware components, such as memory, that can store software. Furthermore, a software module 430 may be another discrete entity that is part of the network entity 400, and which contains software instructions that may be executed by the processor 420 to effectuate one or more of the functions described herein. In addition to the above noted components of the network entity 400, the network entity 400 may also have a transmitter and receiver pair configured to receive and transmit communication signals (not shown).

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method, comprising:
   creating a link between a unique identifier of an asset and unique identifiers of a plurality of sub-assets of the asset within a profile of the asset stored on a blockchain ledger;
   receiving a blockchain transaction for modifying the asset;
   retrieving, via a smart contract installed and executing on the blockchain ledger, the profile of the asset from the blockchain ledger based on the unique asset identifier;
   fetching, via the smart contract, a current date from a server;
   identifying, from the profile, the unique identifiers of the plurality of sub-assets of the asset which are stored as links to the asset identifier within the profile of the asset on the blockchain ledger;
   determining that modifying the asset violates a multi-use constraint linked to at least one sub-asset within the profile of the asset identified from the blockchain ledger based on the current date fetched from the server; and
   in response to a determination that the blockchain transaction violates the multi-use constraint, prohibiting, via the blockchain server, the blockchain transaction and recording the determination to prohibit the blockchain transaction on the blockchain ledger.

2. The method of claim 1, further comprising logging, via the blockchain server, the asset in the blockchain.

3. The method of claim 1, wherein the profile of the asset further comprises one or more of an asset name, an asset supplier, an asset recipient, an asset quantity, and an asset renewal date.

4. The method of claim 1, further comprising:
   creating a secure hash identifier to represent the asset in the blockchain ledger; and
   storing the secure hash identifier in the blockchain ledger.

5. The method of claim 1, further comprising:
   receiving an access attempt of at least one sub-asset;
   responsive to receiving the sub-asset access attempt, retrieving the profile of the asset from the blockchain ledger; and
   creating an analytic report comprising stored sub-asset access attempts and a current sub-asset status.

6. An apparatus, comprising:
   a processor; and
   memory, wherein the processor and memory are communicably coupled and wherein the processor is configured to:
      create a link between a unique identifier of an asset and unique identifiers of a plurality of sub-assets of the asset within a profile of the asset stored on a blockchain ledger;
      receive a blockchain transaction for modifying the asset;
      retrieve, via a smart contract installed and executing on the blockchain ledger, the profile of the asset from the blockchain ledger;
      fetch, via the smart contract, a current date from a server;
      identify, from the profile, the unique identifiers of the plurality of sub-assets of the asset which are stored as links to the asset identifier within the profile of the asset on the blockchain ledger;
      determine that modifying the asset violates a multi-use constraint linked to at least one sub-asset within the profile of the asset identified from the blockchain ledger based on the current date fetched from the server; and
      in response to a determination that the blockchain transaction violates the multi-use constraint, prohibit the blockchain transaction and record the determination to prohibit the blockchain transaction on the blockchain ledger.

7. The apparatus of claim 6, wherein the processor is configured to log the asset in the blockchain.

8. The apparatus of claim 6, wherein the profile of the asset further comprises one or more of an asset name, an asset supplier, an asset recipient, an asset quantity, and an asset renewal date.

9. The apparatus of claim 6, wherein the processor is further configured to:
   create a secure hash identifier to represent the asset in the blockchain ledger; and
   store the secure hash identifier in the blockchain ledger.

10. The apparatus of claim 6, further comprising:
    a receiver configured to receive an access attempt of the at one sub-asset; and
    responsive to receipt of the sub-asset access attempt, the processor is further configured to retrieve the profile from the blockchain ledger and create an analytic report comprising stored sub-asset access attempts and a current sub-asset status.

11. A non-transitory computer readable storage medium storing instructions that when executed causes a processor to perform a method comprising:
- creating a link between a unique identifier of an asset and unique identifiers of a plurality of sub-assets of the asset within a profile of the asset stored on a blockchain ledger;
- receiving a blockchain transaction for modifying the asset;
- retrieving, via a smart contract installed and executing on the blockchain ledger, the profile of the asset from the blockchain ledger based on the unique asset identifier;
- fetching, via the smart contract, a current date from a server;
- identifying, from the profile, the unique identifiers of the plurality of sub-assets of the asset which are stored as links to the asset identifier within the profile of the asset on the blockchain ledger;
- determining that modifying the asset violates the multi-use constraint linked to at least one sub-asset within the profile of the asset identified from the blockchain ledger based on the current date fetched from the server; and
- in response to a determination that the blockchain transaction violates the multi-use constraint, prohibiting, via the blockchain server, the blockchain transaction and recording the determination to prohibit the blockchain transaction on the blockchain ledger.

12. The non-transitory computer readable storage medium of claim 11, wherein the method further comprises logging, via the blockchain server, the asset in the blockchain.

13. The non-transitory computer readable storage medium of claim 11, wherein the profile of the asset further comprises one or more of an asset name, an asset supplier, an asset recipient, an asset quantity, an asset renewal date, and a list of sub-assets.

14. The non-transitory computer readable storage medium of claim 11, wherein the method further comprises one or more of:
- creating a secure hash identifier to represent the asset in the blockchain ledger;
- storing the secure hash identifier in the blockchain ledger;
- receiving an access attempt of at least one sub-asset;
- responsive to receiving the access attempt, retrieving the profile of the asset from the blockchain ledger; and
- creating an analytic report comprising stored sub-asset access attempts and a current sub-asset status.

* * * * *